Feb. 2, 1926.  
J. A. WITTJEN  
POWDER DISTRIBUTOR  
Filed Nov. 14, 1924  
1,571,311

Inventor  
Johannes Anton Wittjen  
By Meyers & Consaul  
Attorney

Patented Feb. 2, 1926.

1,571,311

UNITED STATES PATENT OFFICE.

JOHANNES ANTON WITTJEN, OF HOLLY SPRINGS, MISSISSIPPI.

POWDER DISTRIBUTOR.

Application filed November 14, 1924. Serial No. 749,879.

*To all whom it may concern:*

Be it known that I, JOHANNES ANTON WITTJEN, a citizen of the United States, residing at Holly Springs, in the county of Marshall and State of Mississippi, have invented certain new and useful Improvements in Powder Distributors; and I do hereby declare the following to be a full, clear, and exact description of the invention, such as will enable others skilled in the art to which it appertains to make and use the same.

This invention relates to an improved device for utilization in the distribution of insect destroying powders, or of other powdered material, such as fertilizer, upon plants, and has for its object the provision of an efficient structure admirably adapted to effect the desired distribution in a semi-automatic manner.

Another object of the invention is the provision of a device of the character described which may be very cheaply constructed, easily taken apart for refilling, and which is vertically adjustable to accommodate it to plants of varying heights, to the end that, as the operation passes between the plants the device may hang directly over the latter, the device being so constructed that a sudden downward movement thereof, and a sudden stoppage or a reversal of this movement, will cause the expulsion of a portion of the contents directly upon the plant immediately thereunder.

Other objects of the invention will be made apparent in the following specifications, when read in connection with the drawings forming a part thereof.

In said drawings:—

Figure 1:
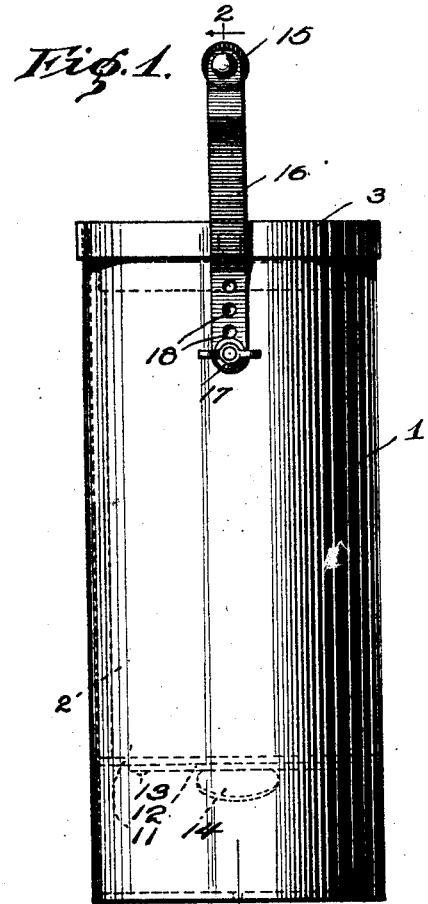
Fig. 1 is a side elevation of the device.

Now referring specifically to the drawings, the device consists of an outer shell 1 which is preferably cylindrical as shown in the drawings, and a powder container 2, which is positioned for reciprocation longitudinally within the shell 1, and preferably concentrically thereof.

The shell 1 is provided with a cover 3, of any well known type, the top of said cover being apertured at 4, and the bottom 5 of the shell is provided with a centrally arranged aperture 6.

Figure 2:
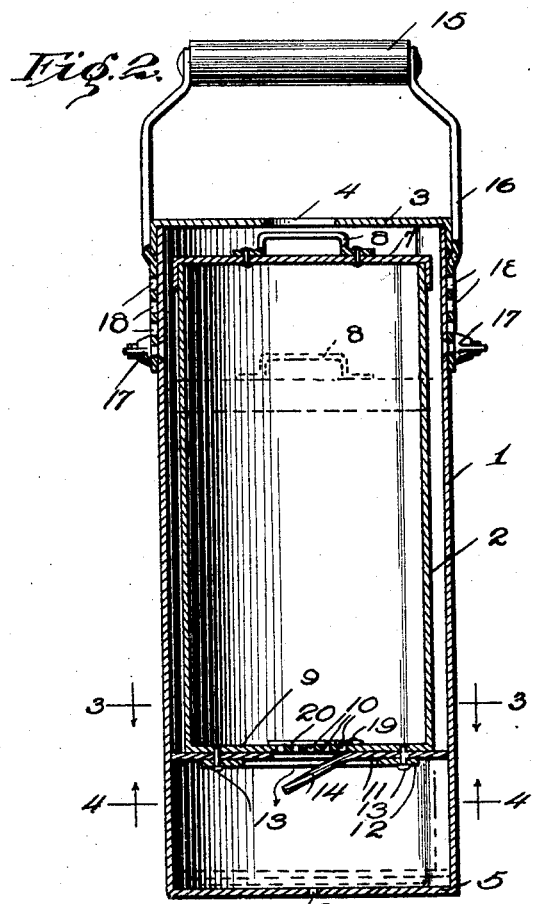
Fig. 2 is a partial section, on the line 2—2 of Fig. 1.
Figure 3:
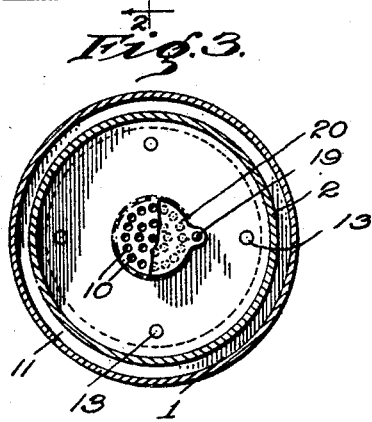
Fig. 3 is a section on the line 3—3 of Fig. 2, looking in the direction of the arrows.

The container 2 is of considerably less diameter than the diameter of the shell 1, and as shown in Fig. 2, is provided with a top 7, having a handle 8. The bottom 9 of the container is also provided with a plurality of centrally arranged apertures 10.

Figure 4:
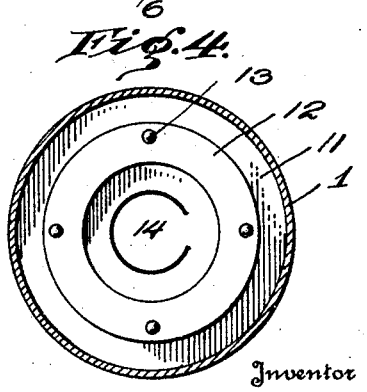
Fig. 4 is a section on the line 4—4 of Fig. 2, looking in the direction of the arrows.

In order to provide the necessary friction between the container 2 and the shell 1, in the reciprocations of the former within the latter, for a purpose which will hereinafter appear, I provide a disk of rubber or leather 11, of the proper consistency. The disk 11 is of a diameter equal to the internal diameter of the shell 1, and is secured to the bottom outside surface of the container 2, so that its periphery contacts the inner wall of the shell, by means of a metal ring 12, small bolts or screws 13 extending through the ring 12 and disk 11, and clamping the disk in position. As shown in Fig. 4, the central portion of the disk 11 is partially cut out to provide a flap-valve 14 located directly below the apertures 10 in the bottom of the container 2.

The metal ring or washer 12 is preferably of a diameter smaller than that of the bottom of the container 2, and, if desired, the flexible disk 11 may be provided with a series of perforations, directly below the bottom of the container 2. Such perforations, while increasing the flexibility of the disk 11, will not interfere with the operation of the device, since, upon the upward movement of the container the disk 11 will bend downwardly at its periphery and facilitate the entry of the air through such perforations. In the downward movement of the container the disk will immediately flatten against the bottom thereof, affording a packing which is practically air tight, it being noted that the device operates along the general principle of a diaphragm pump.

The shell 1 is provided at its top with a bail or handle 15, having arms 16 which extend downwardly and are secured to the walls of the shell 1 by means of screws having wing nuts 17. The lower portions of the arms 16 are provided with spaced apertures 18, whereby to permit of adjustment of the length of the arms 16 in accordance with the height of the operator, or of the plants being treated.

Upon the upper surface of the bottom 9 of the container 2, is pivoted, at 19, a closure disk 20, adapted to be swung into position to cover some or all of the apertures 10. This disk is provided for the purpose of regulating the amount of powder to be delivered through said apertures, and the disk may be set to the desired position while the cover 7 is removed, and before the powder is placed in the container 2, as will be understood.

In operation the cover 3 of the shell, and the cover 7 of the container are removed, and the powder is supplied to the container 2, after which the covers are replaced and the arms 16 so adjusted that, as the device is carried over the plants to be treated, the bottom 5 of the shell will be directly above the plants. At this time the flap-valve 14, being inherently resilient, tends to retain its original position and is consequently covering the apertures 10, and the container is in the position shown in full lines in Fig. 2. When the device reaches a position directly over the plant the operator pushes the device suddenly downward, and, on account of inertia, the container 2 will tend to stand still, the result being that the shell 1 moves downwardly to a certain extent with respect to the container, and the result being the same as if the container should move upwardly within the shell. Manifestly such relative movement causes the valve 14 to open to the position shown in Fig. 2, under the inertia of the valve and the partial vacuum formed in the shell below the container. Such movement of the valve, and of the container draws the powder through the apertures 10, and into the space below the container. It is of course understood that, under the relative movement referred to, the outer flange of the disk 11 seals the space between the container and shell walls, the air above this flange passing out through the aperture 4. When the downward movement of the device is suddenly stopped, or a sudden upward jerk given the device, the container 2 again moves downwardly with respect to the shell 1, resulting in closing the valve 14, and blowing the powder in the shell 1, below the container, directly through the apertures 6 and onto the plant being treated. The degree of movement between the container and shell 1 may be very slight, and it is not thought necessary to indicate it in the drawings, but the degree of movement may be regulated at will by the operator. It is to be understood that the quickness of the downward thrust, the abruptness of its stoppage, or the quickness of the upward thrust which the operator imparts to the device is determinative of the degree of relative movement between the shell and container, and that the degree of relative movement referred to is determinative of the amount of the powder which is delivered to each plant.

One very important advantage derived from the use of this invention is that only one hand of the operator is necessary in the application of the powder to the plants, and at the same time, it presents the same advantages as would be offered if a piston were provided and the other hand of the operator utilized to reciprocate the piston to force the powder upon the plant.

In the present device the operator merely walks between the rows of plants being treated, and is not forced to walk sidewise, as would be the case in the use of a piston pump device. As he reaches a plant he merely pushes the device downwardly and then upwardly very suddenly, so that the treatment of the plant is in effect a semi-automatic operation, the container operating as a pump cylinder. By the use of this device the operator may easily cover twice the territory which could be covered by a pump device.

Various modifications of the structure herein disclosed may be suggested to those skilled in the art, but my invention includes all embodiments falling fairly within the scope of the appended claims.

What I claim is:

1. A device of the character described comprising a shell and a powder container mounted for reciprocation longitudinally within said shell, a flexible disk secured to the container and having its periphery contacting the inner wall of the shell, and means whereby downward movement of the device will expel powder from the container into the shell, and upward movement expel the powder from the shell.

2. A device of the character described comprising a shell having an apertured bottom, a powder container, having an apertured bottom, and longitudinally reciprocable within said shell, and a flexible valve normally covering the apertures in said container, whereby downward thrust of the device opens said valve and releases said powder, and upward thrust of the device closes said valve and causes the container to move relatively to the shell and force the powder out of the latter.

In testimony whereof I affix my signature.

JOHANNES ANTON WITTJEN.